United States Patent
Xu et al.

(10) Patent No.: US 12,269,511 B2
(45) Date of Patent: Apr. 8, 2025

(54) EMERGENCY VEHICLE AUDIO AND VISUAL DETECTION POST FUSION

(71) Applicant: Baidu USA LLC, Sunnyvale, CA (US)

(72) Inventors: Kecheng Xu, Sunnyvale, CA (US); Hongyi Sun, Sunnyvale, CA (US); Qi Luo, Sunnyvale, CA (US); Wei Wang, Sunnyvale, CA (US); Zejun Lin, Sunnyvale, CA (US); Wesley Reynolds, Sunnyvale, CA (US); Feng Liu, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 548 days.

(21) Appl. No.: 17/149,638

(22) Filed: Jan. 14, 2021

(65) Prior Publication Data
US 2022/0219736 A1 Jul. 14, 2022

(51) Int. Cl.
*B60W 60/00* (2020.01)
*B60W 10/18* (2012.01)
(Continued)

(52) U.S. Cl.
CPC ........ *B60W 60/0027* (2020.02); *B60W 10/18* (2013.01); *B60W 10/20* (2013.01); *B60W 30/18163* (2013.01); *G05B 13/027* (2013.01); *G06F 18/21* (2023.01); *G06N 3/045* (2023.01); *G06V 10/22* (2022.01); *G06V 20/41* (2022.01); *G06V 20/584* (2022.01); *G10L 25/30* (2013.01); *G10L 25/51* (2013.01); *H04N 23/90* (2023.01);
(Continued)

(58) Field of Classification Search
CPC ................. B60W 60/0027; G06V 20/584
See application file for complete search history.

(56) References Cited

U.S. PATENT DOCUMENTS 11,282,385 B2  3/2022  Lewis et al.
11,501,532 B2  11/2022  Gan et al.
(Continued)

OTHER PUBLICATIONS

Aparajit Garg et al, "Emergency Vehicle Detection by Autonomous Vehicle," International Journal of Engineering Research and Technology (IJERT), May 1, 2019, 6 Pages.
(Continued)

*Primary Examiner* — Peter D Nolan
*Assistant Examiner* — Jacob Kent Besteman-Street
(74) *Attorney, Agent, or Firm* — WOMBLE BOND DICKINSON (US) LLP

(57) ABSTRACT

In one embodiment, an emergency vehicle detection system can be provided in the ADV travelling on a road to detect the presence of an emergency vehicle in a surrounding environment of the ADV using both audio data and visual data. The emergency vehicle detection system can use a trained neutral network to independently generate a detection result from the audio data, and use another trained network to independently generate another detection result from the visual data. The emergency vehicle detection system can fuse the two detection results to determine the position and moving direction of the emergency vehicle. The ADV can take appropriate actions in response to the position and moving direction of the emergency vehicle.

18 Claims, 8 Drawing Sheets

(51) Int. Cl.
    *B60W 10/20*     (2006.01)
    *B60W 30/18*     (2012.01)
    *G05B 13/02*     (2006.01)
    *G06F 18/21*     (2023.01)
    *G06N 3/045*     (2023.01)
    *G06V 10/22*     (2022.01)
    *G06V 20/40*     (2022.01)
    *G06V 20/58*     (2022.01)
    *G10L 25/30*     (2013.01)
    *G10L 25/51*     (2013.01)
    *H04N 23/90*     (2023.01)
    *H04R 1/08*      (2006.01)
    *H04R 1/40*      (2006.01)
    *H04R 3/00*      (2006.01)

(52) U.S. Cl.
    CPC ............... *H04R 1/08* (2013.01); *H04R 1/406* (2013.01); *H04R 3/005* (2013.01); *B60W 2420/40* (2013.01); *B60W 2420/54* (2013.01); *B60W 2554/402* (2020.02); *B60W 2554/4041* (2020.02); *B60W 2554/4044* (2020.02); *H04R 2499/13* (2013.01)

(56) References Cited

U.S. PATENT DOCUMENTS

| | | |
|---|---|---|
| 2005/0044053 A1 | 2/2005 | Moreno et al. |
| 2017/0249839 A1* | 8/2017 | Becker ............ G08G 1/096725 |
| 2018/0137756 A1* | 5/2018 | Moosaei ............... G05D 1/0287 |
| 2018/0189572 A1 | 7/2018 | Hori et al. |
| 2018/0233047 A1* | 8/2018 | Mandeville-Clarke ..................... B60W 30/00 |
| 2018/0364732 A1 | 12/2018 | Yaldo et al. |
| 2018/0374347 A1 | 12/2018 | Silver et al. |
| 2019/0027032 A1 | 1/2019 | Arunachalam |
| 2019/0049989 A1 | 2/2019 | Akotkar et al. |
| 2019/0163982 A1 | 5/2019 | Block |
| 2020/0089253 A1* | 3/2020 | Sudo ................... G05D 1/0221 |
| 2020/0265273 A1 | 8/2020 | Wei et al. |
| 2021/0150230 A1* | 5/2021 | Smolyanskiy ......... G06V 20/56 |
| 2021/0200803 A1 | 7/2021 | Zhang et al. |
| 2021/0247201 A1 | 8/2021 | Hori et al. |
| 2021/0248183 A1 | 8/2021 | Pratt et al. |
| 2021/0358513 A1 | 11/2021 | Narisetty et al. |
| 2022/0067479 A1 | 3/2022 | Lee et al. |
| 2022/0093101 A1 | 3/2022 | Metallinou et al. |
| 2022/0101629 A1 | 3/2022 | Liu et al. |
| 2022/0121868 A1 | 4/2022 | Chen et al. |
| 2022/0141503 A1 | 5/2022 | Cui et al. |
| 2022/0147602 A1 | 5/2022 | Streit |
| 2022/0147607 A1 | 5/2022 | Streit |
| 2022/0150068 A1 | 5/2022 | Streit |
| 2022/0223037 A1 | 7/2022 | Xu et al. |
| 2022/0292809 A1 | 9/2022 | Choudhary et al. |
| 2022/0351348 A1 | 11/2022 | Chae et al. |
| 2022/0351439 A1 | 11/2022 | Chae et al. |
| 2022/0355814 A1* | 11/2022 | Sharifi ................. B60W 50/14 |
| 2022/0358703 A1 | 11/2022 | Chae et al. |

OTHER PUBLICATIONS

Abhishek Raman et al, "A Hybrid Framework for Expediting Emergency Vehicle Movement on Indian Roads," ICIMIA, Mar. 5, 2020, 6 Pages.

Hongyi Sun et al, "Emergency Vehicles Audio Detection and Localization in Autonomous Driving," Arxiv.org, Cornell University library, Oct. 2, 2021, 6 Pages.

Van-Thuan Tran and Wei-Ho Tsai, "Audio-Vision Emergency Vehicle Detection," IEEE sensors Journal, Nov. 15, 2021, 14 Pages.

Tran, Van-Thuan and Tsai, Wei-Ho, "Acousitc Based Emergency Vehicle Detection Using Convolutional Neural Networks," IEEE Access, Apr. 18, 2020, 12 pages.

Selbes, Berkay and Sert, Mustafa, "Multimodal Vehicle Type Classification Using Convolutional Neural Network and Statistical Representations of MFCC," IEEE Aug. 29, 2017, 6 pages.

* cited by examiner

EMERGENCY VEHICLE AUDIO AND VISUAL DETECTION POST FUSION

CROSS REFERENCE TO RELATED APPLICATIONS

This application is related to application Ser. No. 17/149,659, filed on Jan. 14, 2021. The application is incorporated herein by reference in its entirety.

TECHNICAL FIELD

Embodiments of the present disclosure relate generally to operating autonomous vehicles. More particularly, embodiments of the disclosure relate to systems and methods for detecting emergency vehicles using information from sources.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An ADV needs to take appropriate actions to comply with local traffic rules when emergency vehicles (e.g. police cars, fire trucks and ambulance) are detected on a road. Therefore, accurately detecting emergency vehicles in a surrounding environment of the ADV is important to a travelling ADV such that the AVD does not have to make unnecessary stops. One approach to increasing the accuracy of detection is to use information from multiple sources (e.g., images and voices from sensors on the ADV) to eliminate the instability of a single source. Such an approach requires a fusion of the information from the multiple sources.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
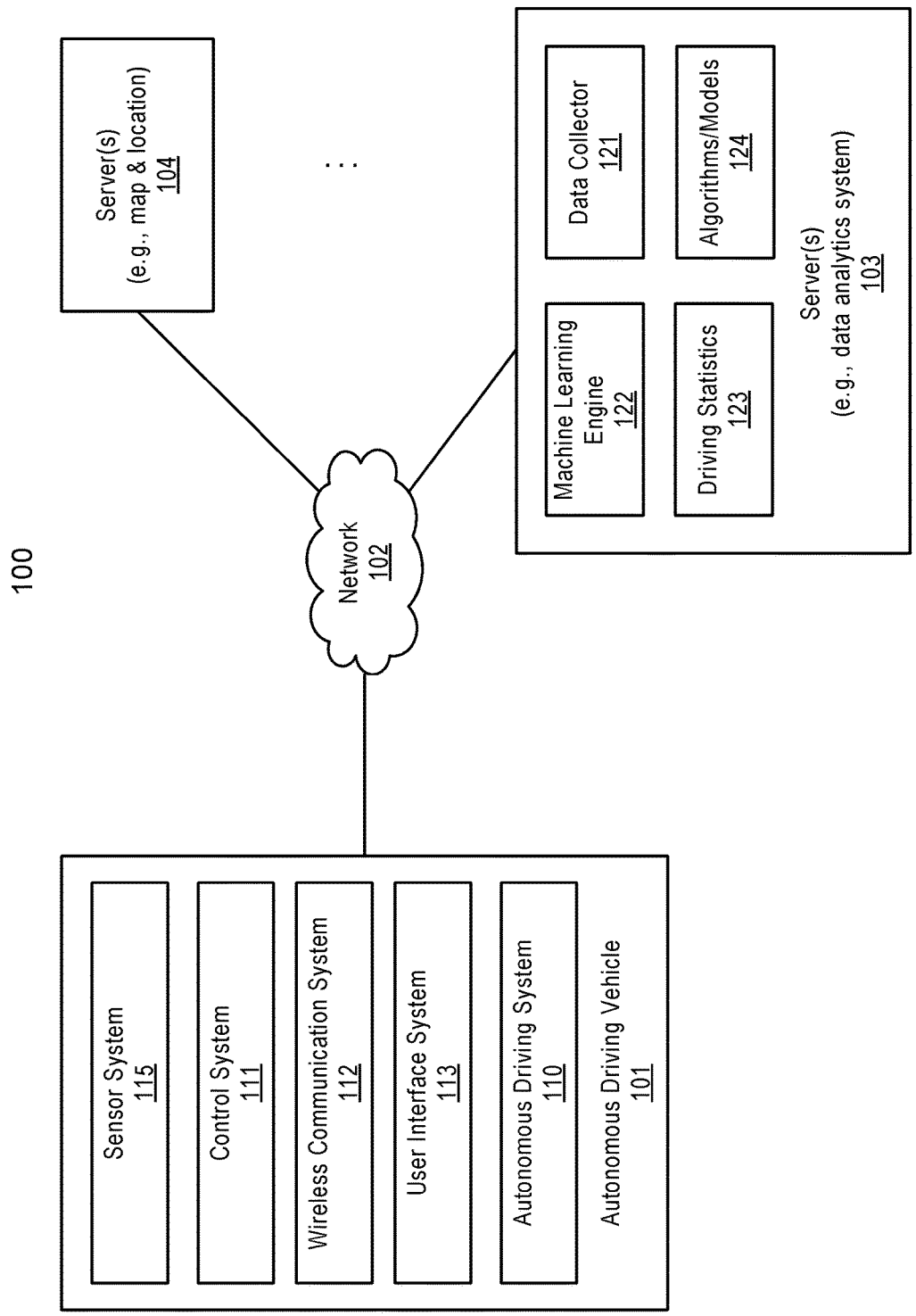
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, systems, methods, and mediums for operating an autonomous driving vehicles (ADV) are described. The embodiments use decision-level fusion (post fusion) of audio data and visual data captured by sensors mounted on the ADV. Compared to feature-level fusion of the audio data and the visual data, the embodiments in this disclosure does not require strict timing synchronization between the audio data and the visual data, and can overcome the problems of different feature reliability of different sources of data.

In one embodiment, an emergency vehicle detection system can be provided in the ADV travelling on a road to detect the presence of an emergency vehicle in a surrounding environment of the ADV using both audio data and visual data. The emergency vehicle detection system can use a trained neutral network to independently generate a detection result from the audio data, and use another trained network to independently generate another detection result from the visual data. The emergency vehicle detection system can fuse the two detection results to determine the position and moving direction of the emergency vehicle. The ADV can take appropriate actions in response to the position and moving direction of the emergency vehicle.

In one embodiment, the emergency vehicle detection system includes an audio submodule and a visual submodule, each submodule being a trained neutral network. The audio submodule can take audio data captured by microphones mounted on the ADV as input, and generate a probability representing how likely a siren sound is present in a surrounding environment of the travelling ADV, and a direction of a source of the siren sound. The visual submodule takes visual data captured by cameras mounted on the ADV as input, and generate a probability representing how likely that an emergency vehicle is present in the surrounding environment, and a distance of the emergency vehicle.

A post fusion component in the emergency vehicle detection system can fuse the detection results from the audio submodule and the visual submodule to determine whether an emergency vehicle is present in the surrounding environment. If it is, the post fusion component can determine the position and moving direction of the emergency vehicle. In one embodiment, if at least one of the two probabilities exceeds a threshold, the emergency vehicle detection system can determine that an emergency vehicle is present in the surrounding environment.

The emergency vehicle detection system uses both audio and visual data, and fuse the detection results from the two types of data, thus improving the performance of the system. Relying on visual data alone, the emergency vehicle detection system may not accurately detect an emergency vehicle in a low-visibility environment. Relying on audio data alone, the emergency vehicle detection system may not accurately detect an emergency vehicle in a noisy environment. A post fusion combination of both types of data would enable the emergency vehicle detection system to perform well in a variety of environments.

The embodiments described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory. The embodiments can also be practiced as method claims.

The above summary does not include an exhaustive list of all embodiments in this disclosure. All systems and methods can be practiced from all suitable combinations of the various aspects and embodiments described in the disclosure.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
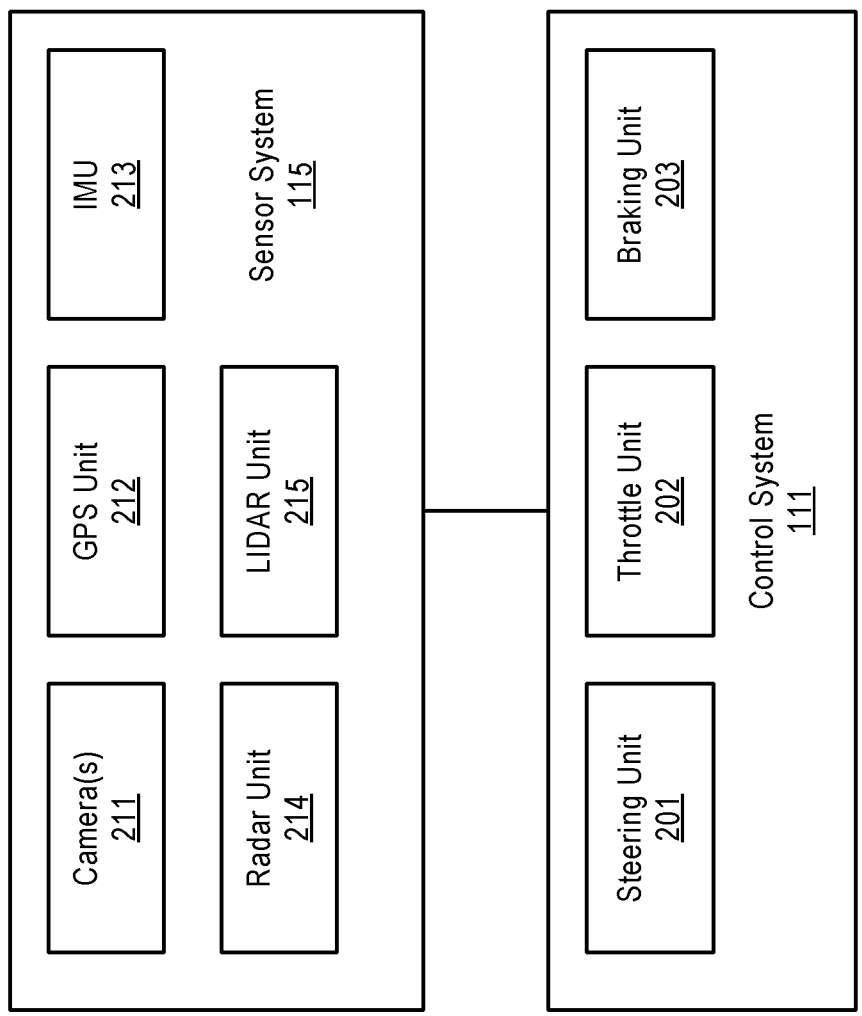
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
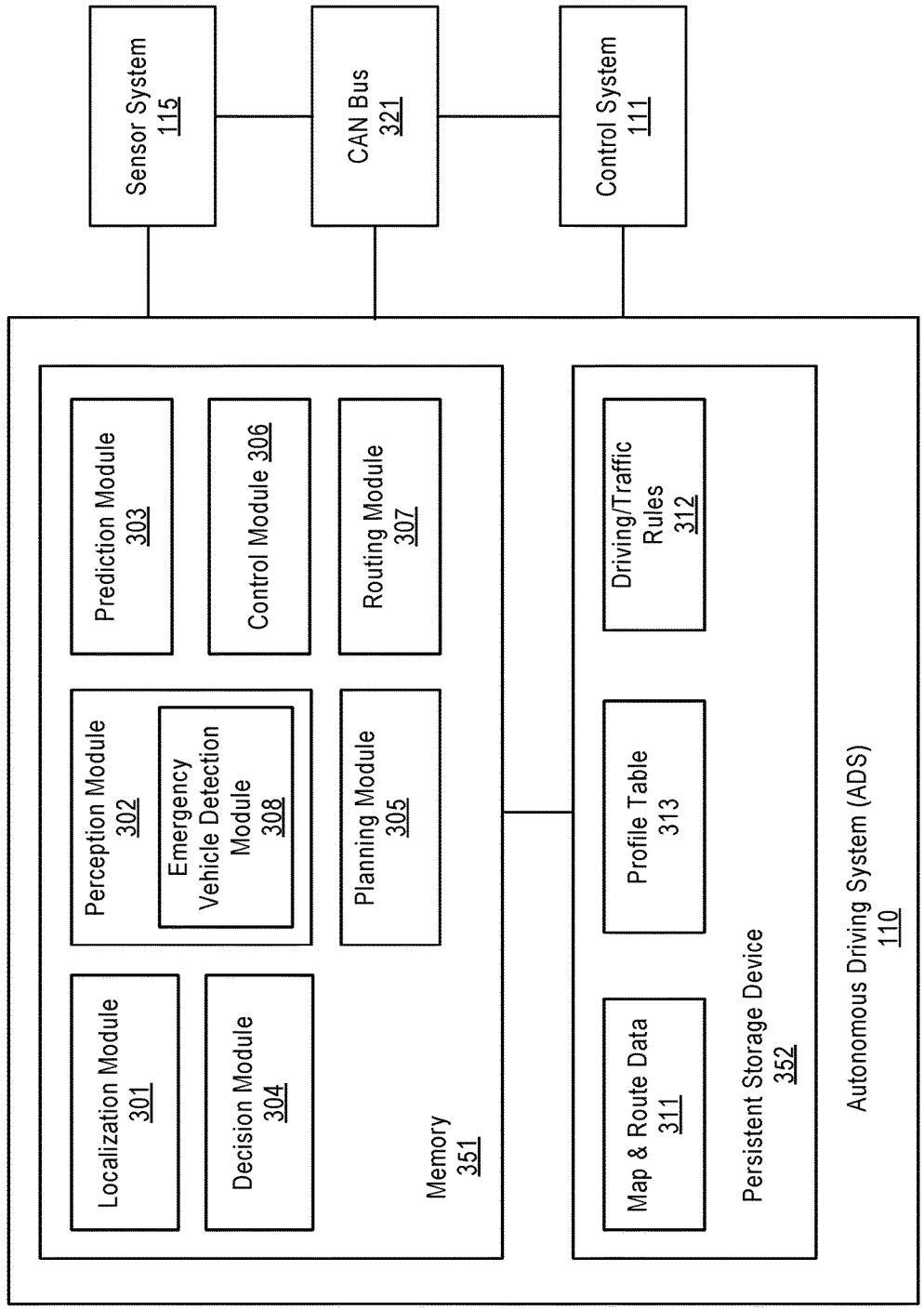
FIGS. 3A-3B are block diagrams illustrating an example of a perception and planning system used with an autonomous vehicle according to one embodiment.
Figure 3B:
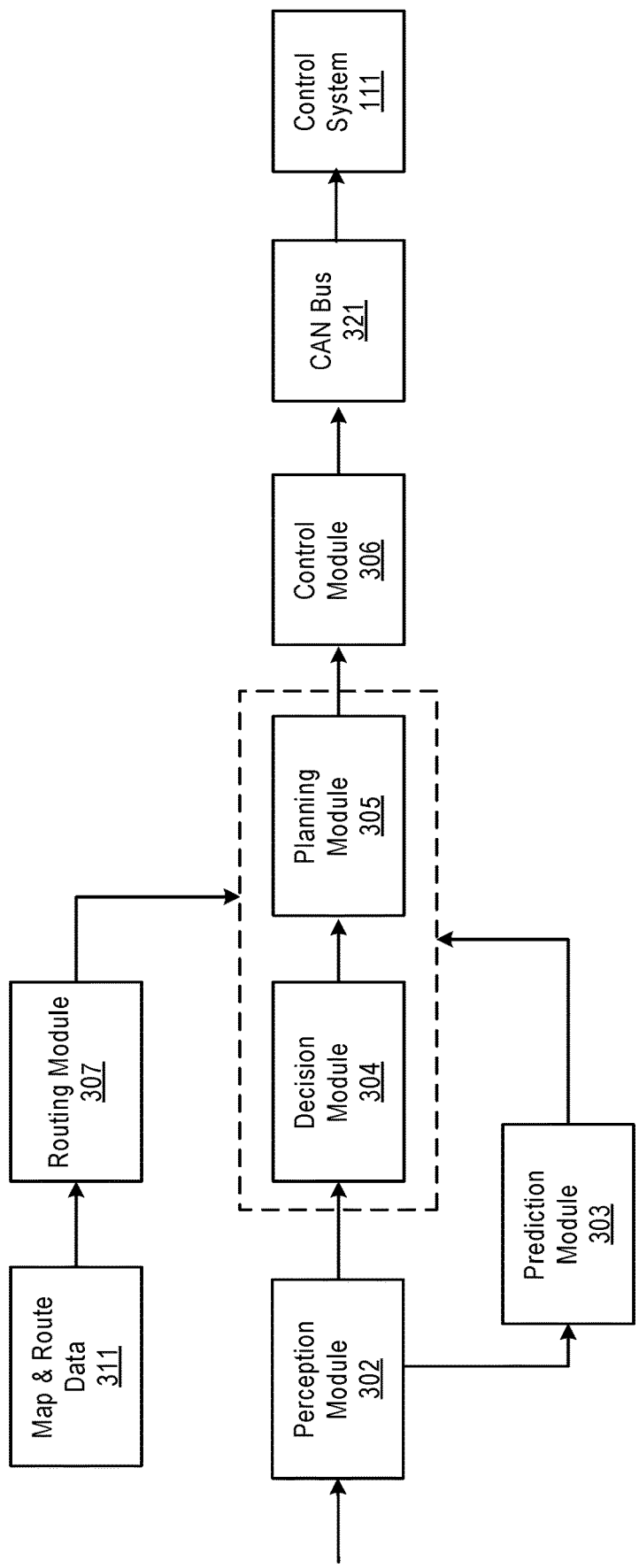

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

Perception module 302 may include an emergency vehicle detection module 308, which can detect the presence of an emergency vehicle in a surrounding environment of the ADV using both audio data and visual data.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route or trajectory for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 via a CAN bus module 321, according to a trajectory (also referred to as a route or path) defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV 101.

Emergency Vehicle Detection

Figure 4:
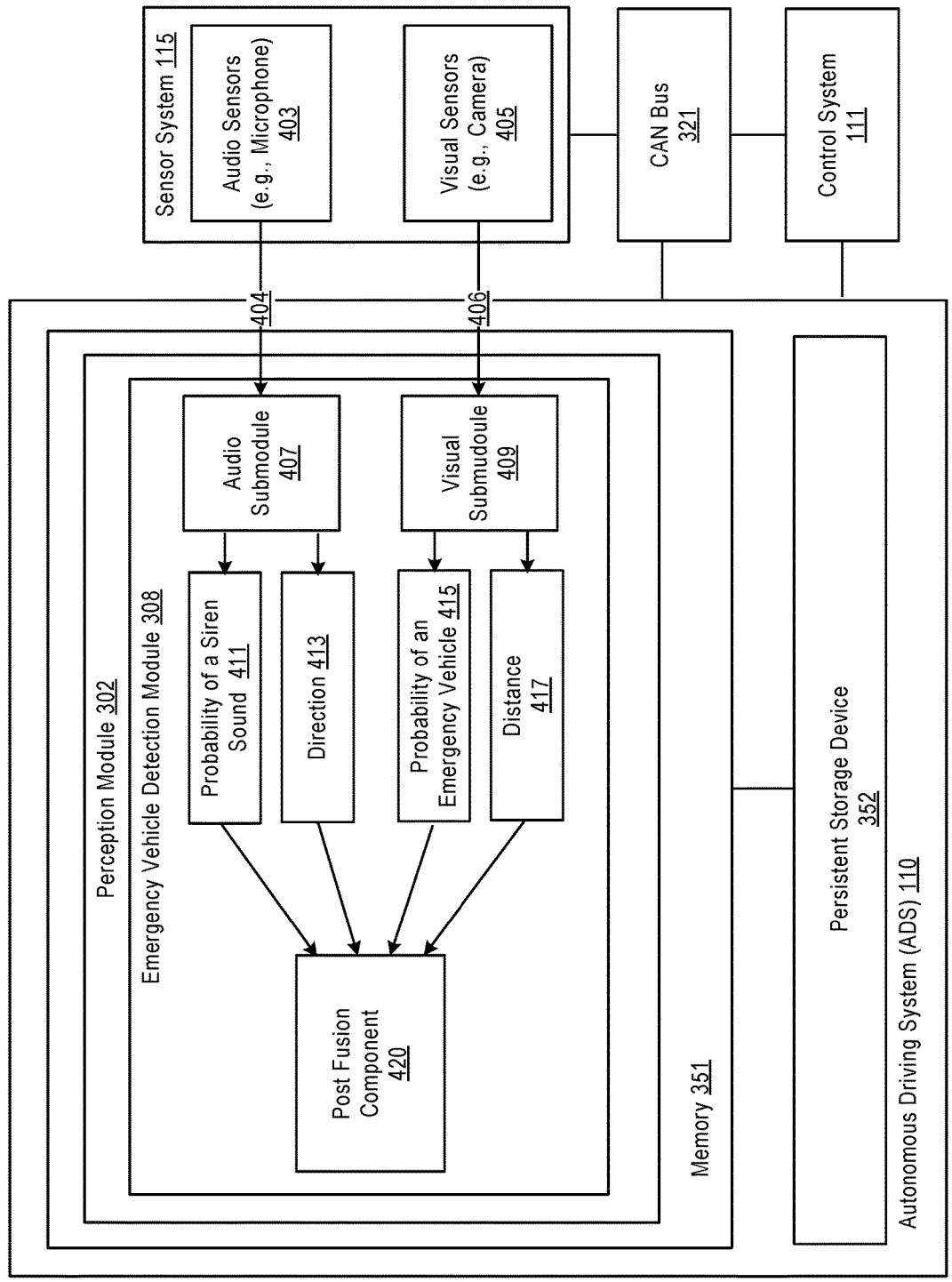
FIG. 4 illustrates an example of an emergency vehicle detection system according to one embodiment.

FIG. 4 illustrates an example of an emergency vehicle detection system 400 according to one embodiment.

As shown in FIG. 4, the emergency vehicle detection module 308 can include an audio submodule 407, and a visual submodule 409. The audio submodule 407 can be a software module that implements a predetermined algorithm or a neural network. The neural network can be a convolutional neural network (CNN) trained using audio training data (e.g., prior to deployment of the ADV) collected from a large number of emergency vehicles. The training data can include a) audio data that is classified as having an emergency vehicle siren, and b) audio data that is classified as not having an emergency vehicle siren.

For example, training data can include numerous audio samples, some of which contain different police sirens, fire truck sirens, and ambulance sirens that are classified as having an emergency vehicle siren, and some of which containing other noises such as, but not limited to, dogs barking, birds chirping, cars honking, music, etc., that are classified as not having an emergency vehicle siren.

In one embodiment, the trained neural network can receive 404 audio data (e.g., audio signals) captured by audio sensors 403 mounted on the ADV 101, and detect, based on the audio data, a presence of an audio signature of an emergency vehicle siren in a surrounding environment of the ADV 101 as the ADV 101 is travelling on a road segment. The audio sensors 403 (also referred to audio capturing devices) can include a number of microphones mounted in different positions of the ADV 101. The microphones can form a microphone array having fixed and known positions on the ADV, arranged to sense sounds in different directions around the ADV 101. The audio submodule 407 can output a probability 411 of the presence of a siren sound from an emergency vehicle, and a direction 413 of the siren sound.

In one embodiment, the direction 413 of the siren sound can be represented by a numerical number and a moving direction indicator. The numerical number is a degree of an angle between a line representing the ADV 101 and a line from a source of the siren sound to the ADV 101. The line representing the ADV 101 can be a line that passes through the ADV 101 along the travelling direction of the ADV 101. The moving direction indicator can indicate whether the source of the siren sound is moving towards the ADV 101 or moving away from the ADV 101. The moving direction of the source of the siren sound can be determined based on changes in the siren's amplitude or frequency (e.g., through the Doppler effect).

In one embodiment, the visual submodule 409 can be a software module that implements a predetermined algorithm or a neural network. The neural network can also be a CNN trained using visual data collected from a large number of emergency vehicles. In one implementation, the CCN can be a You Only Look Once (YOLO)-based neural network model.

The visual submodule 409 can receive 406 visual data captured by visual sensors 405 and determine whether an emergency vehicle exists in the surrounding environment of the ADV 101 as the ADV 101 is travelling on the road. The visual data from the visual sensors 405 and the audio data from the audio sensors 403 are captured simultaneously from the same surrounding environment of the ADV 101. The audio data can be a stream of audio signals and the visual data can be a sequence of image frames.

The visual submodule 409 can output a probability 415 of the presence of an emergency vehicle in the surrounding environment of the ADV 101, and a distance 417 of the emergency vehicle.

When the neural network in the visual submodule 409 is trained, a size of bounding box of each training image frame and extrinsic parameters of the camera used to take the image frame can be used as part of the labeling data of the image frame. Therefore, when an image frame of an emergency vehicle is provided to the trained neutral network, the neutral network model can output a distance of the emergency vehicle to the ADV 101 based on a size of the image frame and extrinsic parameters of the camera used to capture the image frame.

Each image frame can be associated with a set of intrinsic parameters and a set of extrinsic parameters. The intrinsic parameters of a camera are unique to the camera. An example of the intrinsic parameters can be a focal length of the camera. The extrinsic parameters of a camera, on the other hand, are not unique to any given camera. The extrinsic parameters include the relative rotation and translation between cameras in a multi-camera arrangement.

In one embodiment, the emergency vehicle detection module 308 can further include a post fusion component 420 used to fuse the detection results from the audio submodule 403 and the visual submodule 405. As shown above, the detection results are represented by the probability 411 of the presence of a siren sound in the surrounding environment, a direction 413 of the siren sound, the probability 415 of the presence of an emergency vehicle in the surrounding environment, and the distance 417 of the emergency vehicle to the ADV 101. The detection results can also include other outputs (not shown) from the visual submodule 405, for example, whether the emergency vehicle is driving away from the ADV 101 or driving towards the ADV 101.

The post fusion component 420 can fuse the detection results to output information indicating that an emergency vehicle is present in the surrounding environment of the ADV 101, a position of the emergency vehicle, and/or a moving direction of the emergency vehicle.

The output information from the emergency detection module 308 can be used by the autonomous driving system 110 to generate commands or signals to be sent to the vehicle control system 111 via the CAN bus module 321. Based on the commands or signals, the vehicle control system 111 can control the ADV 101 to take appropriate actions.

In one embodiment, the ADV 101 can steer out of a current driving lane or brake to decelerate or steer to the side of the road, in response to determining that the emergency vehicle is moving towards the ADV 101. If the emergency vehicle is moving away from the ADV 101, the ADV 101 can continue along its current path without disturbance.

Figure 5:
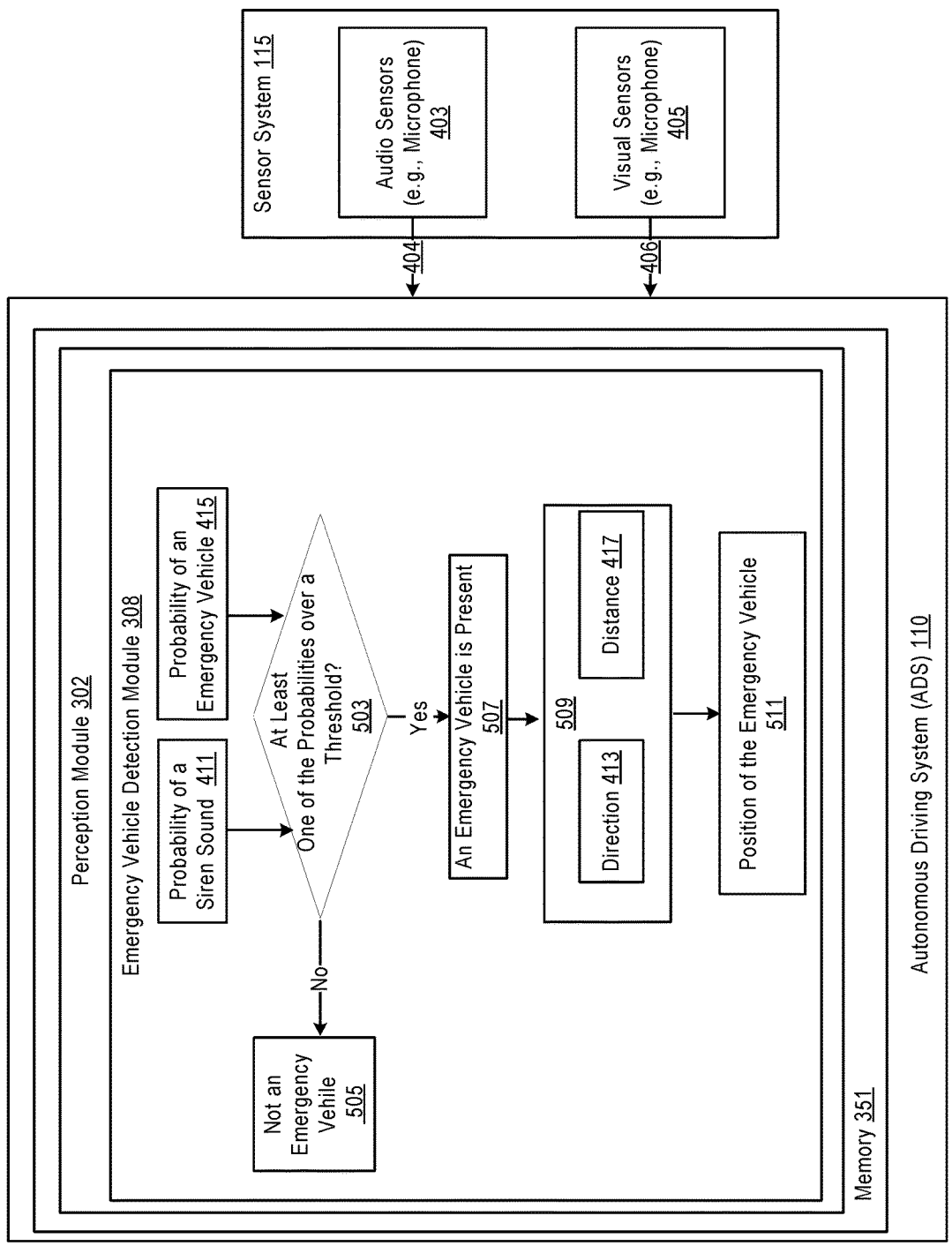
FIG. 5 further illustrates the emergency vehicle detection system according to one embodiment.

FIG. 5 further illustrates the emergency vehicle detection system 400 according to one embodiment. More specifically, FIG. 5 illustrates one implementation of the fusion logic in the post fusion component 420.

In one embodiment, the post fusion component 420 can fuse detections results from two different sources of information, namely, the audio sensors 403 and the visual sensors 405. The detection result from each information source can individually indicate whether an emergency vehicle is present in the surrounding environment of the ADV 101. For example, the probability 411 of the presence of a siren sound indicates that the probability that an emergency vehicle is present because the presence of a siren sound is strongly correlated to the presence of an emergency vehicle. The process of post fusion can combine the detection results from the audio submodule 407 and the visual submodule 409 into a single detection result. The audio-visual fusion can boost the detection performance of the emergency vehicle detection module 308, particular in noisy surrounding environments where the performance of audio classifiers tends to be reduced, and where the visual data is unaffected by acoustic noise.

In one embodiment, an example of a post fusion process is illustrated in the post fusion component 420, which can perform a number of operations, including checking the probability 411 and the probability 415, each of which is associated with a predetermined threshold value, and determining whether at least one of the probability 411 or the probability 415 exceeds its associated threshold, as shown in operation 503. If neither of the probability 411 and the probability 415 exceeds its associated threshold, the post fusion component 308 determines that no emergency vehicle is present in the surrounding environment as shown in operation 505. However, if at least one of the probability 411 or the probability 415 exceeds their respective threshold, the post fusion component 420 determines that an emergency vehicle is present in the surrounding environment, as shown in operation 507.

As further shown, if an emergency vehicle is present, the post function component 420 can fuse the distance 417 of the emergency vehicle to the ADV 101 and the direction 413 of the source of the siren sound in operation 509 to obtain the position of the emergency vehicle as shown in operation 511.

Figure 6A:
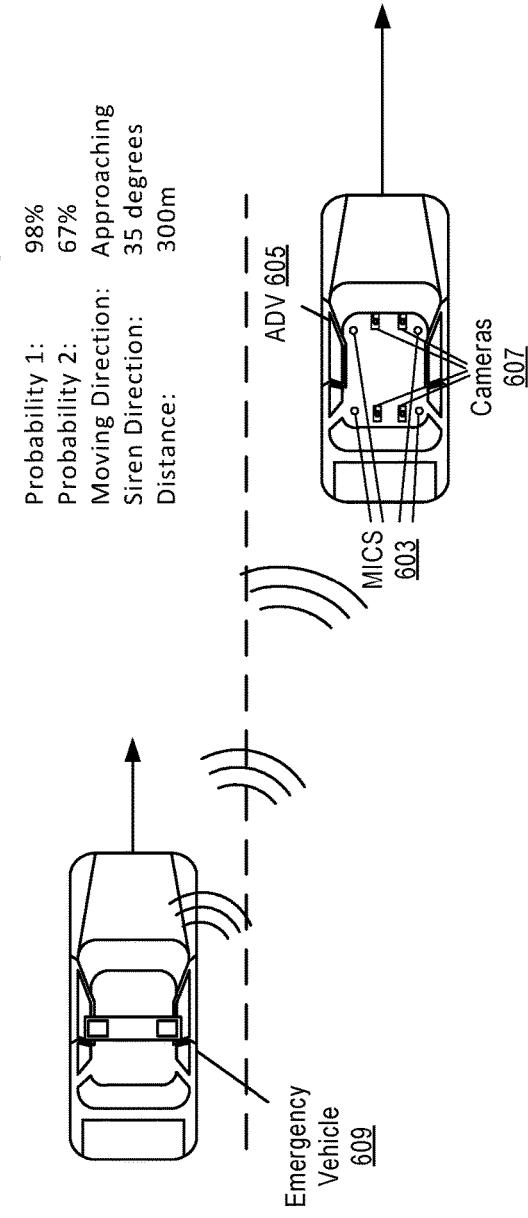
FIGS. 6A-6B illustrate performance advantages of the emergency vehicle detection system in one embodiment.
Figure 6B:
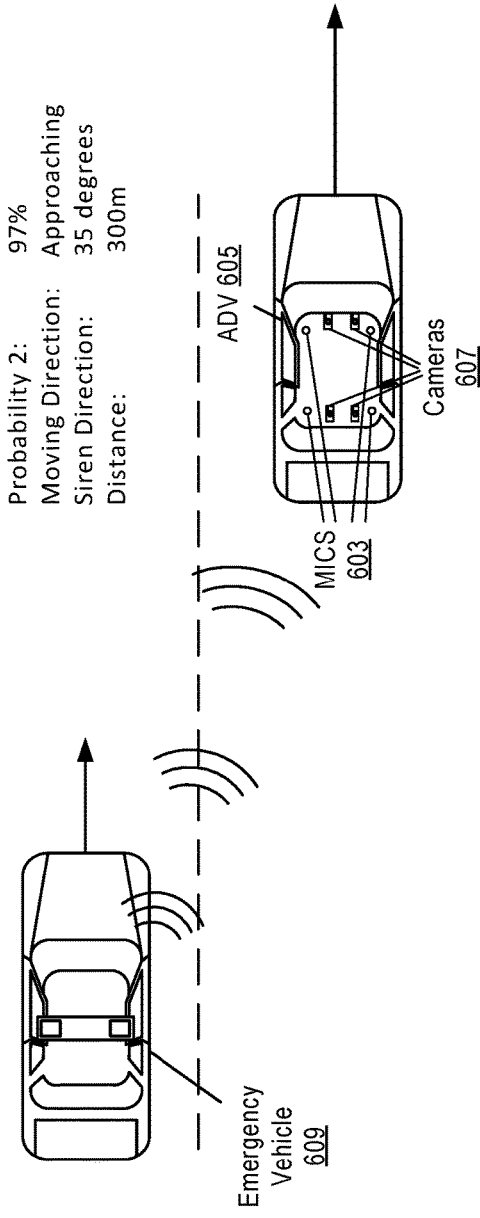

FIGS. 6A-6B illustrate performance advantages of the emergency vehicle detection system 400 in one embodiment. The emergency vehicle detection system 400 uses information from multiple sources for detecting the presence of an emergency vehicle. This multi-source approach would ensure that the emergency vehicle detection system 400 accurately detect the presence of an emergency vehicle in different types of environments.

FIG. 6A shows an example of a surrounding environment that has a low visibility. Although a raining environment is shown, the features and advantages of the emergency vehicle detection system 400 are applicable to other low visibility environments, such as nights.

As shown in FIG. 6A, a microphone array 603 and a camera array 607 are installed on an ADV 601. The microphone array 603 can be used to capture audio signals from a surrounding environment of the ADV 601 as the ADV 601 is travelling on a road. The microphones and cameras installed on the ADV 601 can be arranged in other manners, for example, in a non-array manner. An emergency vehicle 609 is present in the surrounding environment, driving towards the ADV 601 in a different lane.

The emergency vehicle detection system 400 installed in the ADV 601 can receive audio data captured by the microphone array 603, and visual data captured by the cameras array 707, and generate a separate detection result from each of the audio data and the visual data.

The low-visibility environment negatively impacts the detection accuracy based on the visual data, but has no impact on the detection result based on the audio data. For example, the emergency vehicle detection system 400 can determine that the probability of a siren sound being present in the surrounding environment is 98%, and that the probability of the presence of an emergency vehicle in the surround environment is much lower (67%). The visual submodule of the emergency vehicle detection system 400 cannot accurately detect the shape of the emergency vehicle 609 in the raining day, whereas the audio submodule of the emergency vehicle detection system 400 can still accurate detect the siren sound and the direction. As a result, the overall detection accuracy after the post fusion does not suffer, and the emergency vehicle detection system 400 can still accurately detect the emergency vehicle 609.

FIG. 6B shows an example of a surrounding environment with a clear sky that has a noisy environment. In such a noisy environment, the detection result of the audio submodule of the emergency vehicle detection system 400 would suffer (66%) while the detection result of the visual submodule of the emergency vehicle detection system 400 would not be negatively impacted (97%). Thus, after the post fusion, the overall detection accuracy of the emergency vehicle detection system 400 is still high.

Figure 7:
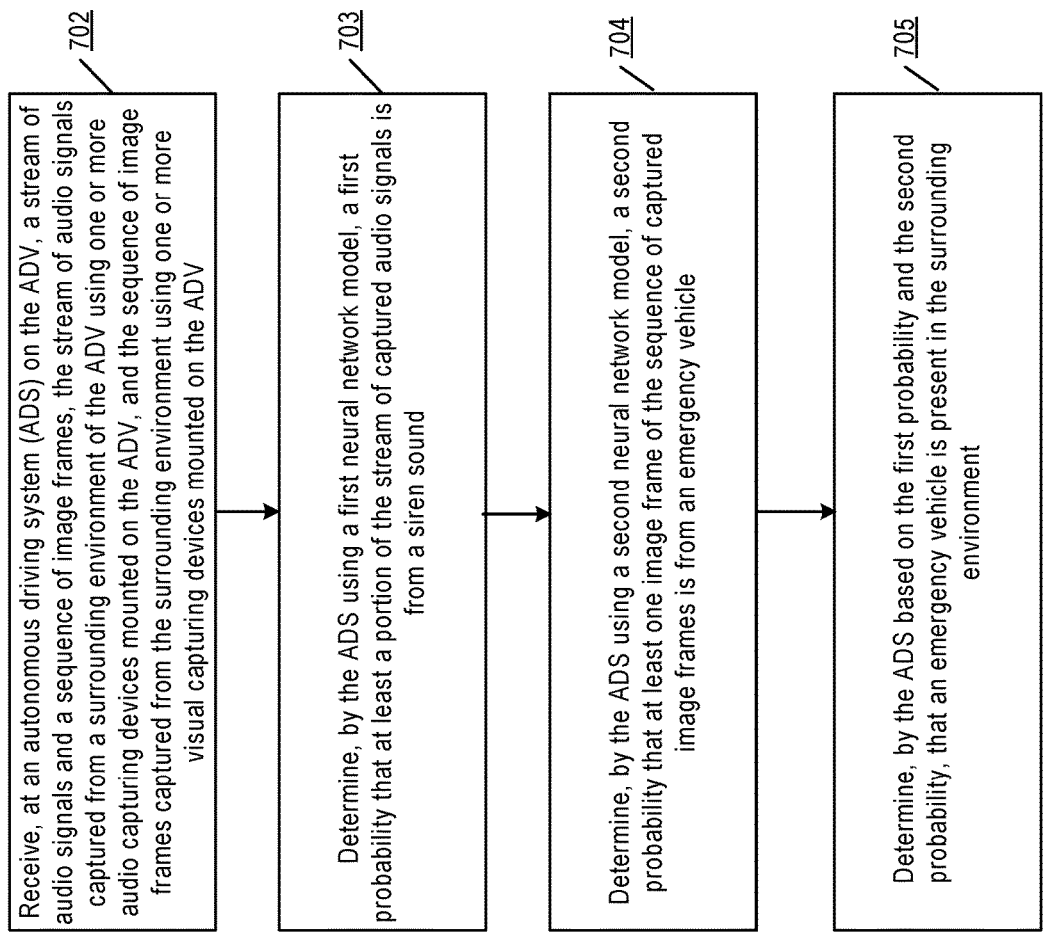
FIG. 7 illustrates a process of detecting an emergency vehicle according to one embodiment.

FIG. 7 illustrates a process 700 of detecting an emergency vehicle according to one embodiment. Process 700 may be performed by processing logic which may include software, hardware, or a combination thereof. For example, process 700 may be performed by the autonomous driving system described in FIG. 4.

As shown in FIG. 7, in operation 701, the processing logic receives a stream of audio signals and a sequence of image frames, the stream of audio signals captured from a surrounding environment of the ADV using one or more audio capturing devices mounted on the ADV, and the sequence of image frames captured from the surrounding environment using one or more image capturing devices mounted on the ADV. In operation 702, the processing logic determines, using a first neural network model, a first probability that at least a portion of the stream of captured audio signals is from a siren sound. In operation 703, the processing logic determines, using a second neural network model, a second probability that at least one image frame of the sequence of captured image frames is from an emergency vehicle. In operation 704, the processing logic determines, based on the first probability and the second probability, that an emergency vehicle is present in the surrounding environment.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the method comprising:
   receiving, at an autonomous driving system (ADS) on the ADV, a stream of audio signals captured using one or more audio capturing devices and a sequence of image frames captured using one or more image capturing devices mounted on the ADV from a surrounding environment of the ADV;
   determining, by the ADS using a first neural network model, a first detection result including a first probability that at least a portion of the stream of captured audio signals is from a siren sound, and a moving direction of the siren sound including a moving direction indicator indicating whether a source of the siren sound is moving towards the ADV or moving away from the ADV;
   determining, by the ADS using a second neural network model, a second detection result including a second probability that at least one image frame of the sequence of image frames is from an emergency vehicle, and a distance between the ADV and the emergency vehicle, wherein the distance between the ADV and the emergency vehicle is determined based on a size of a bounding box surrounding the at least one image frame and one or more extrinsic parameters of an image capturing device used to capture the at least one image frame, wherein the size of bounding box and the one or more extrinsic parameters of the image capturing device is used as part of labeling data of the at least one image frame, and wherein the one or more extrinsic parameters include a relative rotation and translation between cameras in a multi-camera arrangement;
   determining that an emergency vehicle is present in the surrounding environment in response to at least one of the first probability of the first neural network model exceeds a first predefined threshold or the second probability of the second neural network model exceeds a second predefined threshold;
   determining a position of the emergency vehicle and a moving direction of the emergency vehicle by fusing the first detection result of the first neural network model and the second detection result of the second neural network model;
   determining whether the emergency vehicle is moving towards the ADV based on the position of the emergency vehicle and the moving direction of the emergency vehicle; and
   controlling the ADV by steering out of a current driving lane, braking to decelerate, or steering to a side of a road, in response to determining that the emergency vehicle is moving towards the ADV.

2. The method of claim 1, further comprising:
   determining, using the first neural network model, an angle between the ADV and the source of the siren sound, and the moving direction of the source.

3. The method of claim 1,
   wherein the controlling the ADV by steering out of the current driving lane, braking to decelerate, or steering to the side of the road comprises:
      controlling the ADV, by steering out of the current driving lane or braking to decelerate.

4. The method of claim 1, wherein the first neural network model is trained with audio data representing emergency vehicle siren collected from a plurality of emergency vehicles, and wherein the second neural network model is trained with visual data collected simultaneously to the collecting of the audio data.

5. The method of claim 1, wherein each of the first neural network model and the second neural network model is a convolutional neural network.

6. The method of claim 1, wherein the one or more audio capturing devices include one or more microphones, and wherein the one or more image capturing devices include one or more cameras.

7. A non-transitory machine-readable medium having instructions stored therein, which when executed by a processor, cause the processor to perform operations of operating an autonomous driving vehicle (ADV), the operations comprising:
   receiving, at an autonomous driving system (ADS) on the ADV, a stream of audio signals captured using one or more audio capturing devices and a sequence of image frames captured using one or more image capturing devices mounted on the ADV from a surrounding environment of the ADV;
   determining, by the ADS using a first neural network model, a first detection result including a first probability that at least a portion of the stream of captured audio signals is from a siren sound, and a moving direction of the siren sound including a moving direction indicator indicating whether a source of the siren sound is moving towards the ADV or moving away from the ADV;
   determining, by the ADS using a second neural network model, a second detection result including a second probability that at least one image frame of the sequence of image frames is from an emergency vehicle, and a distance between the ADV and the emergency vehicle, wherein the distance between the ADV and the emergency vehicle is determined based on a size of a bounding box surrounding the at least one image frame and one or more extrinsic parameters of an image capturing device used to capture the at least one image frame, wherein the size of bounding box and the one or more extrinsic parameters of the image capturing device is used as part of labeling data of the at least one image frame, and wherein the one or more extrinsic parameters include a relative rotation and translation between cameras in a multi-camera arrangement;
   determining that an emergency vehicle is present in the surrounding environment in response to at least one of the first probability of the first neural network model exceeds a first predefined threshold or the second probability of the second neural network model exceeds a second predefined threshold;
   determining a position of the emergency vehicle and a moving direction of the emergency vehicle by fusing the first detection result of the first neural network model and the second detection result of the second neural network model;

determining whether the emergency vehicle is moving towards the ADV based on the position of the emergency vehicle and the moving direction of the emergency vehicle; and controlling the ADV by steering out of a current driving lane, braking to decelerate, or steering to a side of a road, in response to determining that the emergency vehicle is moving towards the ADV.

8. The machine-readable medium of claim 7, wherein the operations further comprise:

determining, using the first neural network model, an angle between the ADV and the source of the siren sound, and the moving direction of the source.

9. The machine-readable medium of claim 7, wherein the controlling the ADV by steering out of the current driving lane, braking to decelerate, or steering to the side of the road comprises:

controlling the ADV by steering out of the current driving lane or braking to decelerate.

10. The machine-readable medium of claim 7, wherein the first neural network model is trained with audio data representing emergency vehicle siren collected from a plurality of emergency vehicles, and wherein the second neural network model is trained with visual data collected simultaneously to the collecting of the audio data.

11. The machine-readable medium of claim 7, wherein each of the first neural network model and the second neural network model is a convolutional neural network.

12. The machine-readable medium of claim 7, wherein the one or more audio capturing devices include one or more microphones, and wherein the one or more image capturing devices include one or more cameras.

13. A data processing system, comprising:

a processor; and a memory coupled to the processor to store instructions, which when executed by the processor, cause the processor to perform operations of operating an autonomous driving vehicle (ADV), the operations comprising:

receiving, at an autonomous driving system (ADS) on the ADV, a stream of audio signals captured using one or more audio capturing devices and a sequence of image frames captured using one or more image capturing devices mounted on the ADV from a surrounding environment of the ADV, determining, by the ADS using a first neural network model, a first detection result including a first probability that at least a portion of the stream of audio signals is from a siren sound, and a moving direction of the siren sound including a moving direction indicator indicating whether a source of the siren sound is moving towards the ADV or moving away from the ADV, determining, by the ADS using a second neural network model, a second detection result including a second probability that at least one image frame of the sequence of captured image frames is from an emergency vehicle, and a distance between the ADV and the emergency vehicle, wherein the distance between the ADV and the emergency vehicle is determined based on a size of a bounding box surrounding the at least one image frame and one or more extrinsic parameters of an image capturing device used to capture the at least one image frame, wherein the size of bounding box and the one or more extrinsic parameters of the image capturing device is used as part of labeling data of the at least one image frame, and wherein the one or more extrinsic parameters include a relative rotation and translation between cameras in a multi-camera arrangement, determining that an emergency vehicle is present in the surrounding environment in response to at least one of the first probability of the first neural network model exceeds a first predefined threshold or the second probability of the second neural network model exceeds a second predefined threshold, determining a position of the emergency vehicle and a moving direction of the emergency vehicle by fusing the first detection result of the first neural network model and the second detection result of the second neural network model, determining whether the emergency vehicle is moving towards the ADV based on the position of the emergency vehicle and the moving direction of the emergency vehicle, and controlling the ADV by steering out of a current driving lane, braking to decelerate, or steering to a side of a road, in response to determining that the emergency vehicle is moving towards the ADV.

14. The system of claim 13, wherein the operations further comprise:

determining, using the first neural network model, an angle between the ADV and the source of the siren sound, and the moving direction of the source.

15. The system of claim 13, wherein the controlling the ADV by steering out of the current driving lane, braking to decelerate, or steering to the side of the road comprises:

controlling the ADV, by steering out of the current driving lane or braking to decelerate.

16. The system of claim 13, wherein the first neural network model is trained with audio data representing emergency vehicle siren collected from a plurality of emergency vehicles, and wherein the second neural network model is trained with visual data collected simultaneously to the collecting of the audio data.

17. The system of claim 13, wherein each of the first neural network model and the second neural network model is a convolutional neural network.

18. The system of claim 13, wherein the one or more audio capturing devices include one or more microphones, and wherein the one or more image capturing devices include one or more cameras.

* * * * *